Patented Jan. 16, 1934

1,943,876

UNITED STATES PATENT OFFICE 1,943,876

PRODUCTION OF ANTHRAQUINONE DERIVATIVES

Paul Nawiasky, Ludwigshafen - on - the - Rhine, Berthold Stein, Mannheim, and Artur Krause, Ludwigshafen - on - the - Rhine, Germany, assignors to General Aniline Works, Inc., New York, N. Y., a corporation of Delaware No Drawing. Application May 1, 1931, Serial No. 534,458, and in Germany May 10, 1930

11 Claims. (Cl. 260—59)

The present invention relates to new anthraquinone derivatives and to a process for making these as well as other anthraquinone derivatives.

We have found that valuable anthraquinone derivatives are obtained by treating aryloxyanthraquinones with alkali metal alcoholates, i. e. solutions of alkali metals or alkali metal hydroxides in monohydric aliphatic alcohols. In this manner the aryloxy groups are replaced by the alkoxy groups corresponding to the alcohols employed. Since, in many cases, the aryloxy derivatives of anthraquinone are more easy to prepare directly than the corresponding alkoxyanthraquinones, the process according to the present invention constitutes an important industrial method for the manufacture and production of the latter compounds. The alkoxyanthraquinones, especially in so far as they are derivatives of aminoanthraquinones, frequently have considerable industrial importance, as for example as dyestuffs for acetate silk. Particularly valuable dyeings on cellulose esters and ethers are produced by dyeing the said materials with 1.4-diamino-2.3-dialkoxyanthraquinones. When dyeing according to the usual processes, brilliant bluish-red to blue shades having excellent fastness properties are usually obtained with the said dyestuffs. The purity of the shades produced with the said anthraquinone derivatives is better than that of the dyeings obtained with the otherwise similar, corresponding 1.4-diamino-2-alkoxyanthraquinones. The amino groups may be primary amino groups or may be mono- or di-substituted by hydrocarbon radicles. The alkoxy anthraquinones may also serve as the initial materials for the preparation of other dyestuffs or pharmaceutically important products.

The substitution products behave in a similar manner to the aryloxyanthraquinones.

The following examples will further illustrate the nature of this invention, but the invention is not restricted to these examples. The parts are by weight.

Example 1

5 parts of 1-phenoxyanthraquinone are introduced at 80° C. into a solution of 25 parts of caustic potash in 50 parts of methanol. The melt is stirred at the same temperature and after a short time becomes viscous with the formation of fine pale crystals. The conversion into 1-methoxyanthraquinone has then taken place. By diluting the melt with water, filtering by suction and washing with water the 1-methoxyanthraquinone is obtained in an excellent yield.

When ethanol, butanol or other alcohols are employed instead of methanol, the alkoxy derivatives corresponding to these alcohols are obtained. The ethyl derivative melts at from 152° to 153° C. and the normal butyl derivative at from 116° to 117° C.

Example 2

5 parts of 1.4-diamino-2-phenoxyanthraquinone (prepared by boiling 1.4-diamino-2-bromanthraquinone with a solution of sodium phenolate in phenol) are introduced at 80° C. into a solution of 25 parts of caustic potash in 50 parts of methanol and the melt is heated at the same temperature until initial material can no longer be detected which is determined in the simplest manner by observing the absorption spectra of solutions of samples in sulphuric acid containing boric acid. The formation of the methoxy derivative takes place very rapidly. When the solution of a sample in sulphuric acid containing boric acid no longer gives the spectrum of the initial material but gives the characteristic spectrum of 1.4-diamino-2-methoxyanthraquinone, the melt is allowed to cool, is diluted with water and worked up in the usual manner. 1.4-diamino-2-methoxyanthraquinone is thus obtained in practically theoretical yields in a state of excellent purity.

1.4 - diamino - 2 - ethoxyanthraquinone is obtained in an analagous manner by starting with an ethyl alcoholic solution of caustic potash.

Example 3

5 parts of 1.4-diamino-2-phenoxyanthraquinone are introduced at 100° C. into a solution of 25 parts of caustic potash in 50 parts of normal butyl alcohol and the melt is stirred at 100° C. until the spectrum of a solution in sulphuric acid containing boric acid of a sample withdrawn and worked up no longer shows the characteristic lines of the initial material but only those of the newly formed product. By working up the reaction product in the manner described in Example 1, 1.4 - diamino - 2 - (normal butoxy) -anthraquinone having a melting point of from 186° to 188° C. is obtained in a quantitative yield and a state of excellent purity. It dissolves in organic solvents giving a beautiful red-violet colouration. The yellow solution in sulphuric acid changes to a strawberry colouration on the addition of boric acid and has a very powerful orange-red fluorescence. Acetate silk is dyed very clear rose shades.

Example 4

125 parts of ground caustic potash are dissolved in 250 parts of methanol and then 25 parts of 1.4-diamino - 2.3 - diphenoxyanthraquinone (obtainable by boiling 1.4-diamino-2.3-dichlorantraquinone with a solution of sodium phenolate in phenol) are introduced into the solution at 80° C. the conversion into 1.4-diamino-2.3-dimethoxyanthraquinone may be readily followed by observing the spectra of solutions of samples in sulfuric acid containing boric acid. When initial material can no longer be detected the melt is allowed to cool, diluted with water and filtered by suction. According to analysis the new alkoxy derivative contains 64.9 per cent of carbon, 4.7 per cent of hydrogen and 9.2 per cent of nitrogen and this agrees very well with the calculated values for 1.4 - diamino - 2.3 - dimethoxyanthraquinone, namely 64.4 per cent of carbon, 4.7 per cent of hydrogen and 9.4 per cent of nitrogen. The new compound dissolves in concentrated sulphuric acid giving a strawberry red colouration and has a melting point of from 183° to 185° C. It dyes acetate silk clear rose shades.

In the same manner the corresponding 1.4-diamino-2.3-diethoxy anthraquinone melting at from 151° to 152° C. and 1.4-diamino-2.3-dibutoxyanthraquinone melting at 110° C. may be prepared by employing ethanol and butanol instead of methanol.

Example 5

1 kilogram of acetate silk is dyed with a suspension of 10 grams of 1.4-diamino-2.3-dimethoxyanthraquinone, obtainable according to Example 4 which has been brought into a state of fine dispersion for example by precipitation from sulphuric acid by the addition of water, in a bath of 20 litres of water with an addition of from 40 to 60 grams of soap. It is preferable to start at about room temperature and to continue the dyeing for about an hour while slowly raising the temperature to 75° C. Dyeings having brilliant rose shades are obtained which are somewhat more bluish than those obtained with 1.4-diamino-2-methoxyanthraquinone.

Similar dyeings are obtained by employing 1.4-diamino-2.3-diethoxyanthraquinone or 1.4 - diamino-2.3 - di - normal - butoxyanthraquinone instead of 1.4-diamino-2.3-dimethoxyanthraquinone.

What we claim is:—

1. The process of producing alkoxyanthraquinones which comprises heating a phenoxyanthraquinone with an alkali metal alcoholate.
2. The process of producing alkoxyanthroquinones which comprises heating an amino-phenoxyanthraquinone with an alkali metal alcoholate.
3. The process of producing methoxyanthraquinones which comprises heating a phenoxyanthraquinone with alkali metal methylate.
4. The process of producing ethoxyanthraquinones which comprises heating a phenoxyanthraquinone with alkali metal ethylate.
5. The process of producing butoxyanthraquinones which comprises heating a phenoxyanthraquinone with alkali metal butylate.
6. Amino-dialkoxyanthraquinones.
7. Amino-2.3-dialkoxyanthraquinones.
8. 1.4-diamino-2.3-dialkoxyanthraquinones.
9. 1.4-diamino-2.3-dimethoxyanthraquinone.
10. 1.4-diamino-2.3-diethoxyanthraquinone.
11. 1.4-diamino-2.3-dibutoxyanthraquinone.

PAUL NAWIASKY.
BERTHOLD STEIN.
ARTUR KRAUSE.